(12) United States Patent
Le et al.

(10) Patent No.: US 12,359,151 B2
(45) Date of Patent: Jul. 15, 2025

(54) METHODS OF SEPARATING FILAMENTOUS FUNGI AND OTHER COMPONENTS FROM MOLD-FERMENTED COMPOSITIONS, AND USES OF SEPARATED COMPONENTS

(71) Applicant: Terramino Inc., Berkley, CA (US)

(72) Inventors: Kimberlie Le, Berkeley, CA (US); Joshua Nixon, Berkeley, CA (US)

(73) Assignee: Terramino Inc., Berkeley, CA (US)

( * ) Notice: Subject to any disclaimer, the term of this patent is extended or adjusted under 35 U.S.C. 154(b) by 0 days.

(21) Appl. No.: 17/175,305

(22) Filed: Feb. 12, 2021

(65) Prior Publication Data

US 2022/0002644 A1 Jan. 6, 2022

Related U.S. Application Data

(63) Continuation of application No. 16/906,199, filed on Jun. 19, 2020, now abandoned.
(Continued)

(51) Int. Cl.
*C12H 1/10* (2006.01)
*A23K 10/30* (2016.01)
(Continued)

(52) U.S. Cl.
CPC .............. *C12H 1/10* (2013.01); *A23K 10/30* (2016.05); *A23K 50/40* (2016.05); *A23L 5/23* (2016.08);
(Continued)

(58) Field of Classification Search
CPC . A23L 33/14; A23L 27/50; A23L 5/23; A23L 11/50; A23L 31/00; A23K 10/12;
(Continued)

(56) References Cited

U.S. PATENT DOCUMENTS 3,773,523 A 11/1973 Chhuy et al.
3,885,048 A 5/1975 Liggett
(Continued)

FOREIGN PATENT DOCUMENTS

AU 523283 B2 7/1982
CA 2695823 9/2011
(Continued)

OTHER PUBLICATIONS

Filho, et al., "Vegan-mycoprotein concentrate from pea-processing industry byproduct using edible filamentous fungi", Fungal Biol Biotech, Issue 5. No. 5, 2018, pp. 1-10.
(Continued)

*Primary Examiner* — Vera Stulii
(74) *Attorney, Agent, or Firm* — Holzer Patel Drennan

(57) ABSTRACT

Methods of separating components traditionally considered as waste material from mold-fermented compositions are described. The waste components can be separated either from unfiltered compositions or from a separation stream separated from a composition. In some embodiments, filamentous fungus used in the production of the mold-fermented composition is specifically targeted for separation. Incorporation of separated waste components into various products are also described herein. In some embodiments, the separated components are used in alternative meat products and other foods designed for human consumption. Separated components can also be used in animal feed, as feed stock for other fermentation processes, or for use in treating food, creating cosmetics, or chemical processes.

24 Claims, 11 Drawing Sheets

Related U.S. Application Data

(60) Provisional application No. 62/864,946, filed on Jun. 21, 2019.

(51) Int. Cl.
*A23K 50/40* (2016.01)
*A23L 5/20* (2016.01)
*A23L 27/50* (2016.01)
*A23L 31/00* (2016.01)
*A23P 10/40* (2016.01)
*B01D 11/04* (2006.01)
*C12F 3/00* (2006.01)
*C12G 3/08* (2006.01)
*C12H 1/18* (2006.01)
*C12H 3/02* (2019.01)
*C12H 3/04* (2019.01)

(52) U.S. Cl.
CPC .............. *A23L 27/50* (2016.08); *A23L 31/00* (2016.08); *A23P 10/40* (2016.08); *B01D 11/0415* (2013.01); *C12F 3/00* (2013.01); *C12G 3/08* (2013.01); *C12H 1/18* (2013.01); *C12H 3/02* (2019.02); *C12H 3/04* (2019.02); *A23V 2002/00* (2013.01)

(58) Field of Classification Search
CPC ........ A23K 10/37; A23K 50/40; A23K 10/30; B01D 11/0288; B01D 11/0488; B01D 11/0492; B01D 11/0415; B01D 11/028; C12F 3/00; A23P 10/40; C12G 3/08; C12G 3/022; C12G 3/02; C08L 3/02; C08L 89/00; C08B 30/04; A23J 1/008; A23J 3/20; C12H 3/02; C12H 1/10; C12H 1/18; C12H 3/04
See application file for complete search history.

(56) References Cited

U.S. PATENT DOCUMENTS

| | | | |
|---|---|---|---|
| 4,265,915 A | 5/1981 | MacLennan et al. | |
| 4,466,988 A | 8/1984 | Towersey et al. | |
| 4,636,390 A | 1/1987 | Segard et al. | |
| 5,316,782 A | 5/1994 | Zimlich | |
| 5,427,933 A | 6/1995 | Chen et al. | |
| 6,022,394 A | 2/2000 | Paananen et al. | |
| 7,045,160 B1 | 5/2006 | De et al. | |
| 8,672,245 B2 | 3/2014 | Finnigan et al. | |
| 10,039,306 B2 | 8/2018 | Vrljic et al. | |
| 10,172,381 B2 | 1/2019 | Vrljic et al. | |
| 2003/0157219 A1 | 8/2003 | Bijl et al. | |
| 2004/0029828 A1 | 2/2004 | Nishiyama et al. | |
| 2006/0130162 A1 | 6/2006 | Kyle et al. | |
| 2006/0292287 A1 | 12/2006 | Onwulata | |
| 2007/0082088 A1 | 4/2007 | Kato et al. | |
| 2008/0069927 A1 | 3/2008 | Altemueller | |
| 2008/0153148 A1 | 6/2008 | Kanner et al. | |
| 2008/0280006 A1 | 11/2008 | Onwulata | |
| 2009/0017515 A1 | 1/2009 | Gaudin et al. | |
| 2018/0014567 A1 | 1/2018 | Finnigan et al. | |
| 2018/0084815 A1 | 3/2018 | Wolf | |
| 2018/0214505 A1* | 8/2018 | Ano | A61K 38/05 |
| 2018/0303044 A1 | 10/2018 | Soni et al. | |
| 2019/0037895 A1 | 2/2019 | Shiraishi | |
| 2019/0059431 A1 | 2/2019 | Kozubal et al. | |
| 2019/0069575 A1 | 3/2019 | Shigeta et al. | |
| 2020/0323238 A1 | 10/2020 | Pibarot et al. | |
| 2021/0045409 A1 | 2/2021 | Witteveen et al. | |
| 2021/0059287 A1 | 3/2021 | Kozubal et al. | |
| 2021/0092978 A1 | 4/2021 | Xu et al. | |
| 2021/0392920 A1 | 12/2021 | Dyson et al. | |
| 2022/0400726 A1 | 12/2022 | Kozubal et al. | |

FOREIGN PATENT DOCUMENTS

| | | |
|---|---|---|
| CN | 86108557 A | 7/1988 |
| CN | 1620914 A | 6/2005 |
| CN | 101460607 A | 6/2009 |
| CN | 103987271 A | 8/2014 |
| CN | 106290533 A | 1/2017 |
| CN | 106578115 A | 4/2017 |
| CN | 109757604 A | 5/2019 |
| CN | 208821671 | 5/2019 |
| CN | 210145664 | 3/2020 |
| EP | 0986960 A1 | 3/2000 |
| EP | 2835058 A1 | 2/2015 |
| FR | 2955771 A1 | 8/2011 |
| JP | S5486695 A | 7/1979 |
| JP | 61239861 A | 10/1986 |
| JP | S61239861 | 10/1986 |
| JP | S62179366 A | 8/1987 |
| JP | 63065998 A | 3/1988 |
| JP | S6337630 B2 | 7/1988 |
| JP | H0361473 | 3/1991 |
| JP | H03232482 | 10/1991 |
| JP | 105317025 | 12/1993 |
| JP | H07135912 A | 5/1995 |
| JP | 08056642 A | 3/1996 |
| JP | 08098666 A | 4/1996 |
| JP | H0898666 A | 4/1996 |
| JP | H1075739 A | 3/1998 |
| JP | 3356238 B2 | 12/2002 |
| JP | 2008012464 A | 1/2008 |
| JP | 2009221135 A | 10/2009 |
| JP | 2010178655 A | 8/2010 |
| JP | 2016042818 A | 4/2016 |
| JP | 2016222646 A | 12/2016 |
| JP | 2019510492 A | 4/2019 |
| JP | 2020014427 A | 1/2020 |
| KR | 100762848 B1 | 10/2007 |
| KR | 101283288 B1 | 7/2013 |
| KR | 10-2020-0044920 A | 4/2020 |
| KR | 10-2022-0033482 A | 3/2022 |
| TW | 202300033 A | 1/2023 |
| WO | 2000065029 A1 | 11/2000 |
| WO | 2002005657 A1 | 1/2002 |
| WO | 2005060765 A1 | 7/2005 |
| WO | 2007139321 A1 | 12/2007 |
| WO | 2013087558 A1 | 6/2013 |
| WO | 2015024751 A1 | 2/2015 |
| WO | 2016044423 A1 | 3/2016 |
| WO | 2017151684 A1 | 9/2017 |
| WO | 2018002587 A1 | 1/2018 |
| WO | 2020074782 A1 | 4/2020 |
| WO | 2020092306 A1 | 5/2020 |
| WO | 2020152689 A1 | 7/2020 |
| WO | 2020154634 A1 | 7/2020 |
| WO | 2022197816 A1 | 9/2022 |

OTHER PUBLICATIONS

"International Search Report and Written Opinion", issued in PCT/US22/20575, Jun. 30, 2022, 9 pages.
"International Search Report and Written Opinion", issued in PCT/US2023/065546, Aug. 7, 2023, 11 pages.
"International Search Report and Written Opinion", issued in PCT/US2023/065792, Jul. 31, 2023, 10 pages.
"International Search Report and Written Opinion", issued in PCT/US2020/038613, Aug. 21, 2020, 13 pages.
"International Search Report and Written Opinion", issued in PCT Application No. PCT/US2023/065795, Aug. 7, 2023, 10 pages.
"International Search Report and Written Opinion", issued in PCT/US2020/045886, Sep. 29, 2020, 18 pages.
Asadollahzadeh, M. , et al., ""Production of fungal biomass protein by filamentous fungi cultivation on liquid waste streams from pulping process"", Bioresources, 2018, vol. 13, No. 3, May 15, 2018, pp. 5013-5031.
Han, Emily, "How to Make Tempeh", Published on Jun. 8, 2019. Retrived on Sep. 24, 2020 on <URL: https://www.thekitchn.com/

(56) References Cited

OTHER PUBLICATIONS how-to-make-tempeh-cooking-lessons-from-the-kitchn-202369>Whole document, images of the final tempeh product.

Kim, S.J., "Domestic Technology Trends in Natural Dyes", Bulletin of Food Technology, vol. 20, No. 1, 2007, pp. 38-68 (31-pages).

Okubo, Kazuyoshi, et al., "Chemical Properties of Proteins in Pressed Cake from Soy Sauce Mash", J. Brew. So., Japan, vol. 84, No. 12, 1989, pp. 869-875 (7-pages).

Miri, T., et al., "Flow induced fibre alignment in Mycoprotein paste", Food Research International, Elsevier, vol. 38, No. 10, Dec. 1, 2005, 10 pages.

* cited by examiner

METHODS OF SEPARATING FILAMENTOUS FUNGI AND OTHER COMPONENTS FROM MOLD-FERMENTED COMPOSITIONS, AND USES OF SEPARATED COMPONENTS

CROSS-REFERENCE TO RELATED APPLICATIONS

The present application is a continuation of U.S. application Ser. No. 16/906,199, filed on Jun. 16, 2020, which claims priority under 35 U.S.C. § 119(e) to U.S. Provisional Patent Application No. 62/864,946, filed Jun. 21, 2019 the entirety of which is hereby incorporated by reference.

TECHNICAL FIELD

The present application is directed generally to methods of separating filamentous fungi and other components from mold-fermented compositions, and uses of the separated components in alternative meat and other food products, animal feed, and other applications.

BACKGROUND

The use of fungi in the production of various foods and beverages, including alcoholic beverages, has been known for centuries. Fungi is often used to ferment some aspect of the food or beverage as part of the process of making the food or beverage. In many instances, the fermentation process used in the production of a food or beverage is followed by a separation or filtration process in which a waste stream produced from the fermentation process is separated from the food or beverage composition. This waste stream often includes both solid and liquid components, and the solid component can include portions of the fungi used during the fermentation process.

Waste streams produced from the production of mold-fermented foods and beverage are considered a waste product because the components of the waste stream have been thought to have little to no utility. In some instances, waste streams have been used as a sauce, as an ingredient in marinades, or as a flavor enhancer. When used in this manner, the whole waste stream is typically incorporated into the sauce, marinade or flavor enhance (i.e., no further processing or separation is carried out on the waste stream prior to its incorporation into the sauce, marinade or flavor enhancer).

Regardless of the limited uses previously identified for mold-fermented composition waste streams and/or its components, the fungi component of the waste stream has consistently been treated as a waste product with no practical use. As such, no technology has been developed for specifically separating a fungi component from a waste stream produced in the production of mold-fermented compositions. Furthermore, no safe-for human consumption refined food products incorporating the fungi component of the waste stream have been developed. Similar issues have also arisen with respect to other components of mold-fermented composition waste streams long traditionally considered to be useless. As such, these waste streams are most often discarded, or given away, such as use as agricultural input, thus adding to the amount of garbage produced and/or eliminating or minimizing the possibility of deriving economic gain from this byproduct of the production of mold-fermented compositions.

It would therefore be beneficial to develop new uses for the less desirable components of waste streams formed from the production of mold-fermented compositions. Correspondingly, it would also be useful to develop methods of effectively separating these components from waste streams.

DETAILED DESCRIPTION

Described herein are methods of separating components of mold-fermented compositions traditionally considered as waste and uses of these components in various applications. In some embodiments, methods of separating filamentous fungus from mold-fermented compositions, or from a separation stream produced in the production of mold-fermented compositions, are described. Methods for separating other components, such as starches, are also described.

Also described herein are various products in which the components separated from mold-fermented compositions are incorporated and uses of the components separated from mold-fermented compositions in various products. In some embodiments, separated filamentous fungus is incorporated into alternative meats and other food products. Other uses of the separated components described herein include in animal feed, in food treatment, in manufacturing cosmetics, or in chemical processes.

Figure 1:
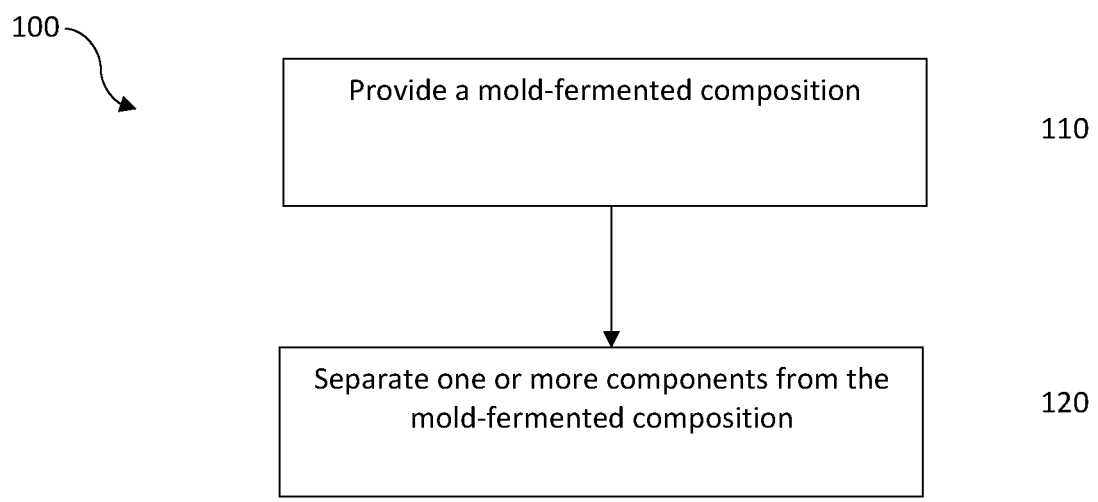
FIG. 1 is a flow chart illustrating a method of separating one or more components from a mold-fermented composition according to various embodiments described herein.
Figure 1A:
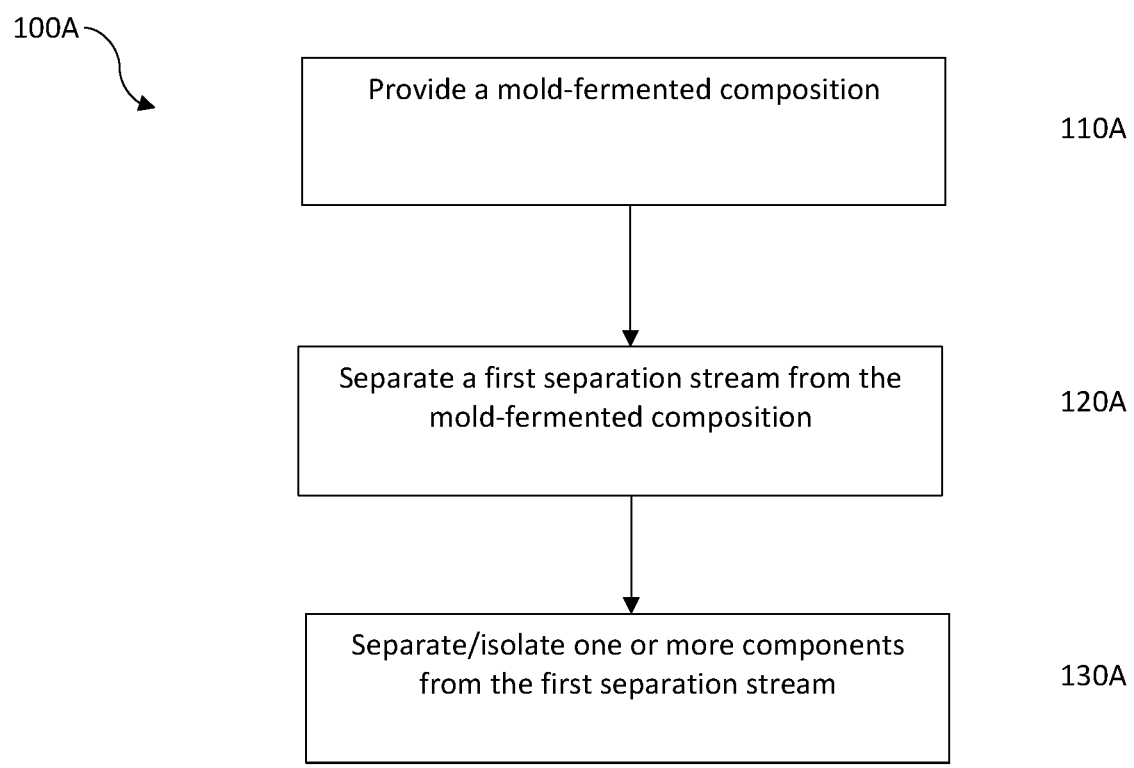
FIG. 1A is a flow chart illustrating a method of separating one or more components from a mold-fermented composition according to various embodiments described herein.

With reference to FIG. 1, a method 100 of separating one or more components from a mold-fermented composition generally includes a step 110 of providing an unfiltered mold-fermented composition, and a step 120 of separating one or more components from the unfiltered mold-fermented composition. With reference to FIG. 1A, a method 100A of separating one or more components from a mold-fermented composition generally includes a step 110A of providing an unfiltered mold-fermented composition, a step 120A of separating a separation stream from the mold-fermented composition, and a step 130A of separating or isolating one or more components from the separated stream.

Methods described herein generally relate to separating or isolating one or more components from a mold-fermented composition, or from a separation stream produced in the production of a mold-fermented composition. In step 110 of method 100 or step 110A of method 100A, a mold-fermented composition is provided. As used herein, the term "mold-fermented composition" generally includes any food or beverage composition that uses mold to ferment one or more ingredients of the food or beverage composition during the process of making the food or beverage composition. Reference to "mold-fermented composition" includes both alcoholic and non-alcoholic compositions. Non-limiting examples of mold-fermented beverages include, but are not limited to: Sake, Mirin, Sochu, Soju, Dansul, Jiuniang, Cheongju, Amazake, Awamori, Doburoku, Shaosing-chu, Takju, Yakju, Makgeolli, Samsu, Tapai, Tapuy, Thai rice wine, Ruhi, Pachwai, and Brem Bali. More generally, the mold fermented beverage can be any alcoholic beverage produced by saccharifying a plant material with a filamentous fungus in which a byproduct containing said filamentous fungus is produced.

Non-limiting examples of mold-fermented foods include, but are not limited to, soy sauce, tempeh and miso. When the mold-fermented composition is provided in step 110 or step 110A, the mold-fermented composition may be in a finished product state (i.e., suitable for sale, distribution, human consumption, etc.) or may be in a pre-finished product state (i.e., where further processing steps are to be carried out prior to the composition being sold, distributed, consumed, etc.).

The specific type of mold used in the production of the mold-fermented composition provided in step 110 or 110A is generally not limited. In embodiments where the mold-fermented composition is, for example, sake, the mold can be *Aspergillus oryzae*, a type of filamentous fungus. In other embodiments, the mold can be *Rhizopus oryzae* or *Aspergillus sojae*. More generally speaking, in some embodiments, the mold-fermented composition is made using a filamentous fungus as the mold component. Filamentous fungus generally includes any type of fungus in which fungal mycelium growth is exhibited during production of the mold-fermented beverage. While not a mold, the embodiments described herein may also apply to mushroom-fermented compositions, or any fungi producing a multi-cellular structure or mycelium.

During the production of the mold-fermented composition provided in step 110 or 110A, various components/ingredients are used during one or more specific steps of the process which while serving one or more functions during the process of making the composition are not desired, useful and/or beneficial in the primary or other final form of the composition. In some embodiments, these components do not negatively impact the composition in any meaningful or substantive way, and are therefore left in the composition despite having no utility to the final composition. In other embodiments, steps are taken during the process of making the composition in which these components are removed from the composition before the composition is in its final form. Typically, these components are separated from the composition as part of a waste stream that includes multiple components, and which is somewhat imprecisely separated from the composition towards the end of the composition-making process.

However, in embodiments described herein, more precise separation and/or isolation is carried out to obtain highly concentrated amounts of one or more components that can then be used in other applications as described in further detail below. Thus, in step 120 of method 100, one or more components are separated from the mold-fermented composition (in final form or in pre-final form), while in step 120A and step 130A of method 100A, a separation stream is separated from the mold-fermented composition, and then one or more specific components are separated or isolated from the separation stream.

The point during production of the composition that specific components are removed from the composition is generally not limited. In some embodiments, separation occurs at one of two general points during composition production. In the embodiment of FIG. 1 and method 100, separation step 120 is carried out when the composition still contains most if not all of the waste material that would typically be removed as part of separating a separation stream from the composition. For example, in the case of sake production, the waste stream (typically referred to as sake kasu) is typically removed from the sake towards the end of overall sake-making process. Sake kasu may contain rice grains/starch, water, yeast, and filamentous fungus. However, in embodiments where separation of one or more components is carried out when the composition still contains most or all of the waste material, the one or more components are removed prior to separating the overall waste stream (i.e., sake kasu) from the sake. In one example, sake production is carried out up to the point where a mixture of sake and what would otherwise become sake kasu is present, at which point one or more components are targeted for separation from the combined sake and sake kasu. In some embodiments, filamentous fungus is specifically targeted for removal from the combined sake and sake kasu, leaving a combination of sake and the remaining components of the sake kasu (e.g., starch, yeast, etc.) after filamentous fungus separation. Subsequent processing steps can be used to separate the starch and other waste components from the sake, but at least one component (e.g., filamentous fungus) has already been separated in this embodiment.

In the embodiment of FIG. 1A and steps 120A and 130A, the mold-fermented composition and a separation stream produced in the production of the mold-fermented beverage are separated in step 120A, and individual components are then separated and/or isolated from the separation stream in step 130A. Step 130A can employ either or both of a separation, in which the desired components are separated from the separation stream in order to obtain the desired components (which may be in the form of a second separation composition), and isolation, in which non-desired components are separated from separation stream to leave behind the desired components. In the case of sake, sake and sake kasu are separated as per traditional sake production methods, and one or more components are then separated or isolated from the sake kasu stream. Again using filamentous fungus as a specific example, the sake kasu separated from the sake will include filamentous fungus, starch, yeast, water, etc., and step 130A involves processing the sake kasu to remove or isolate a concentrated amount of filamentous fungus from the sake kasu.

The above described embodiments illustrate how the component can be removed and/or isolated at different phases of the mold-fermented composition production process, with specific emphasis on removing/isolating the component either from the combined composition and the would-be separation stream (e.g., pre- or unfiltered composition), or from a separation stream after it has been separated from the primary composition. The above described embodiments highlight the ability to remove filamentous fungus, but it should be appreciated that other components or combinations of components can also be separated/isolated at the various points in the manufacturing process.

As discussed above, the mold-fermented composition from which a separation component (such as in the form of a separation composition) can be separated and/or isolated is generally not limited. Sake has been provided as a specific example of a mold-fermented composition, and any specific type of sake can be used. Specific types of sake from which waste components can be separated/isolated include, for example, namazake, genshu, muroka, nigorizake, seishu, etc. Other mold-fermented beverages from which separation components can be separated/isolated include, but are not limited to, mirin, amazake and makgeolli. Any specific types of these beverages can be used.

Regardless of whether the separation component is separated/isolated from the combined composition and would-be separation stream or from the separation stream, the specific manner of separating/isolating the separation component is generally not limited. Different separation/isolation techniques and processes may be used based on the specific separation component being separated/isolated, the specific composition from which the separation component is being separated/isolated, and other considerations. Generally speaking, physical, chemical, enzymatic, temperature, and biological separation/isolation techniques, including various combinations thereof in any sequence, can be used to separate/isolate separation components (or compositions) from the beverage.

Physical methods of separating/isolating components that can be used in step 120 or step 130A can include, but are not limited to: sifting unfiltered composition (i.e., composition combined with would-be separation stream) or separated stream though a vibrating screen or membrane; pushing the unfiltered composition or separated stream through a screen/membrane with a pump (or other method of producing pressurized flow); pulling the unfiltered composition or separated stream through a screen/membrane using a vacuum; pushing the unfiltered composition or separated stream through a screen/membrane using centrifugation; separating by density components of the unfiltered composition or separated stream using centrifugation; belt filtration of the unfiltered composition or separated stream; tangential flow of the unfiltered composition or separated stream across a screen/membrane; gravity feed of the unfiltered composition or separated stream through a screen/membrane; pressing the unfiltered composition or separated stream to remove solids from liquids; particle size separation of the unfiltered composition or separated stream through settling over time in water or other solution; or density separation of the unfiltered composition or separated stream through settling over time in solution. When using screens/membranes, additional methods of scraping off or displacing cake from the screen/membrane can also be incorporated into the separation/isolation techniques. Parameters such as screen mesh size, centrifuge speed, vacuum pressure, etc., can also be adjusted to maximize separation and/or target separation of specific separation components.

Chemical and/or enzymatic separation techniques can include use of a solvent to selectively dissolve a specific component. When a solvent is used in the separation/isolation process, the specific type of solvent is not limited. In some embodiments, the solvent may be water or an alcohol. Chemical and/or enzymatic separation can also include using additional fermentation by an organism to produce enzymes that degrade/digest specific components. The specific type and amount of solvent, as well as the specific organism can be adjusted to maximize separation and/or target a specific component for separation. In some embodiments, the enzyme used is an amylase enzyme, though other enzymes may also be suitable for use.

Temperature separation/isolation techniques can include heat treatment of the unfiltered composition or separated stream to solubilize components or make them more susceptible to enzymatic digestion and thereby increase separation. Various temperatures ranges can be used to maximize separation and/or target specific components for separation. Certain volatile molecular components, such as alcohol, may be removed during heating or vacuum or some combination thereof.

Biological separation/isolation techniques can include using additional fermentation by an organism to digest specific components. The specific type of organism can be adjusted to maximize separation and/or target a specific component for separation.

Additional separation/isolation techniques contemplated herein include keeping the mold or yeast used in the process alive past its initial use and allowing the mold or yeast to produce enzymes that degrade specific components or digest specific components.

As noted previously, one or more of the above described separation techniques can be used in combination and in specific sequences in order to maximize separation/isolation and/or target a specific component for separation/isolation. The combination of techniques can include multiple techniques from one type of separation/isolation techniques (e.g., multiple physical separation/isolation techniques) or multiple separation/isolation techniques from different types of separation/isolation techniques (e.g., one or more physical separation/isolation techniques combined with one or more chemical separation/isolation techniques, etc.).

Figure 1B:
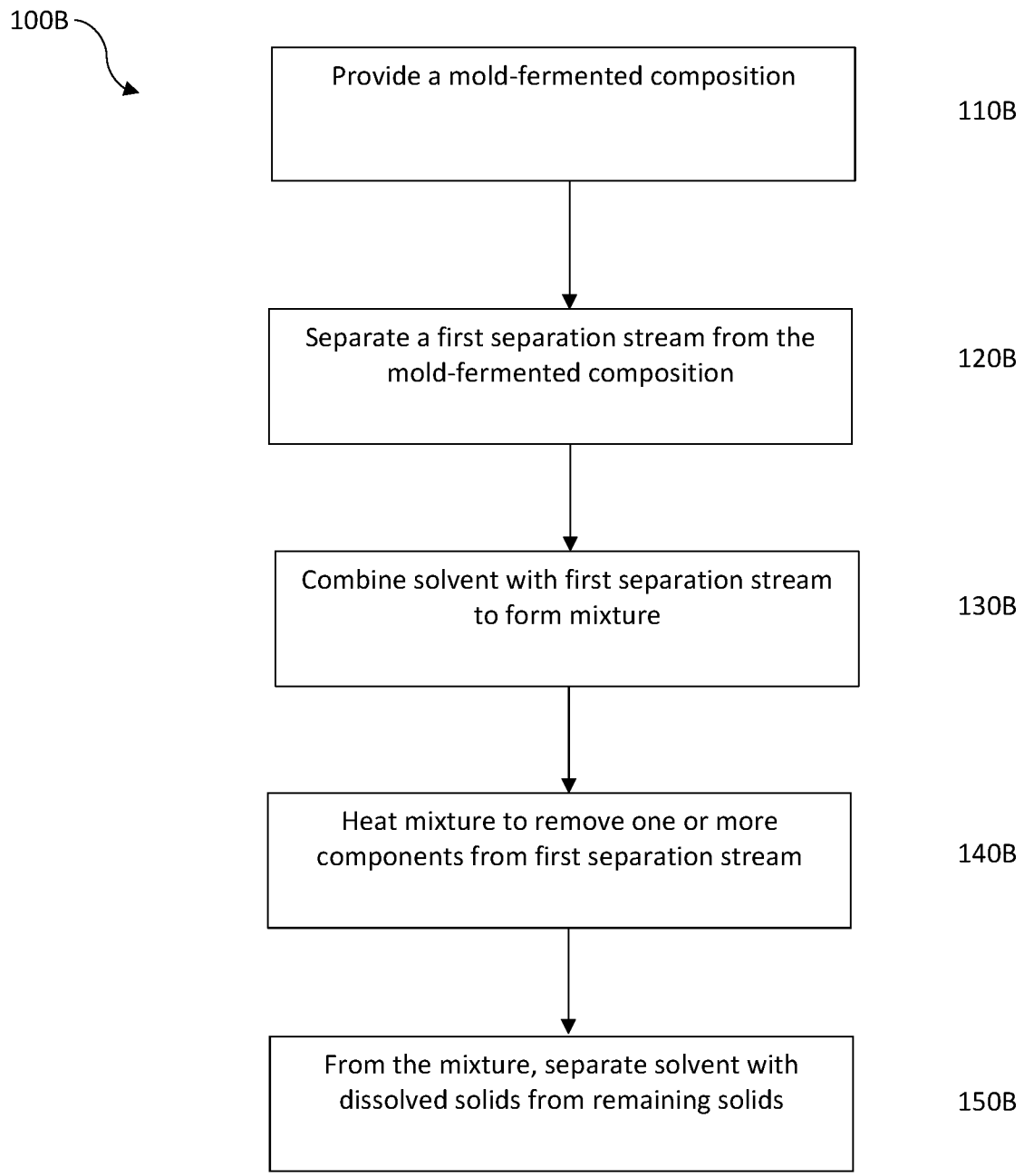
FIG. 1B is a flow chart illustrating a method of separating one or more components from a mold-fermented composition according to various embodiments described herein.

With reference to FIG. 1B, a method 100B for separating components from a mold-fermented composition generally comprises a step 110B of providing an unfiltered mold-fermented composition, a step 120B of separating a separation stream from the mold-fermented composition, a step 130B of combining the separation stream with a solvent to form a mixture, a step 140B of heating the mixture to remove one or more first separation components, and a step 150B of separating solvent with dissolved solids from the remaining solids.

Steps 110B and 120B generally follow the same guidelines as steps 110A and 120A discussed in greater detail above. Steps 130B, 140B and 150B generally provide a specific exemplary method for performing step 130A as discussed above wherein one or more desired components are separated and/or isolated from the separation stream.

In step 130B, a solvent is combined with the separation stream and the solvent and separation stream are mixed together in order to promote interaction between the solvent and the components of the separation stream. In some embodiments, the solvent used in step 130B is a solvent that interacts with (e.g., dissolves) the desired components of the separation stream. In other embodiments, the solvent can be one that interacts with the undesired components of the separation stream. Any suitable solvent can be used, with exemplary though non-limiting solvents including water or an alcohol. The amount of solvent added to the separation stream is also generally not limited, and may be used in whatever quantities necessary to provide the desired amount of interaction with the components of the separation stream. As noted previously, mixing may be used to promote interaction between the solvent and the components of the separation stream, and any suitable mixing techniques or apparatus can be used for any suitable amount of time and at any suitable rate. It should also be appreciated that mixing may not be required.

In step 140B, the mixture of solvent and separation stream is heated in order to remove from the mixture one or more undesired components via evaporation. Generally speaking, the heating step 140B can be used to boil off low boiling-point components in the mixture that are not part of the desired final components to be separated from the separation stream. The temperature to which the mixture is heated is generally not limited, though the temperature may be closely controlled such that only undesired components are boiled off from the mixture. The temperature used in the heating step may be impacted by the solvent used in step 130B in embodiments where it is desired that the solvent remains in the mixture after the heating step. Any means of heating the mixture can be used, and the heating can be carried out in one more phases and at one or more temperatures. In some embodiments, modified pressure is used to supplement the heating step and require lower or higher temperatures to boil off the desired components.

In step 150B, the mixture is separated into a solvent fraction (including solid components dissolved therein) a remaining solids fraction of the mixture (i.e., the solids not dissolved in the solvent). Depending on the components of the mixture and the solvent selected, the desired component may be the solids dissolved in the solvent fraction or the solids separated from the solvent fraction. Any suitable separation equipment can be used for carrying out step 150B, and any specific operating parameters that will effectively carry out the desired separation can be used. In the case where the desired component is dissolved solids in the solvent, a further processing step can be carried out to remove the solids from the solvent. In one non-limiting example, centrifugation is used to carry out the separation step 150B.

In a specific embodiment of method 100B, the method is used to separate filamentous fungi from sake kasu or mirin kasu. In this specific embodiment, step 110B will generally include providing unfiltered sake or mirin prior to the removal of what would become sake kasu or mirin kasu, and step 120B will involve the separation of the sake kasu or mirin kasu from the unfiltered sake or mirin. In step 130B, solvent is added to the sake kasu or mirin kasu, with one suitable solvent for use with sake kasu and mirin kasu being water. In step 140B, the mixture of water and either sake kasu or mirin kasu is heated to remove alcohol and other volatile compounds from the sake kasu or mirin kasu. In step 150B, the separation is carried out so that the water solvent fraction, having filamentous fungi dissolved therein, is separated from the remaining solid components of the sake kasu or mirin kasu. A similar method may also be applicable to shoyu kasu which is produced in the manufacture of soy sauce or any other similar separation stream containing filamentous fungi.

Figure 1C:
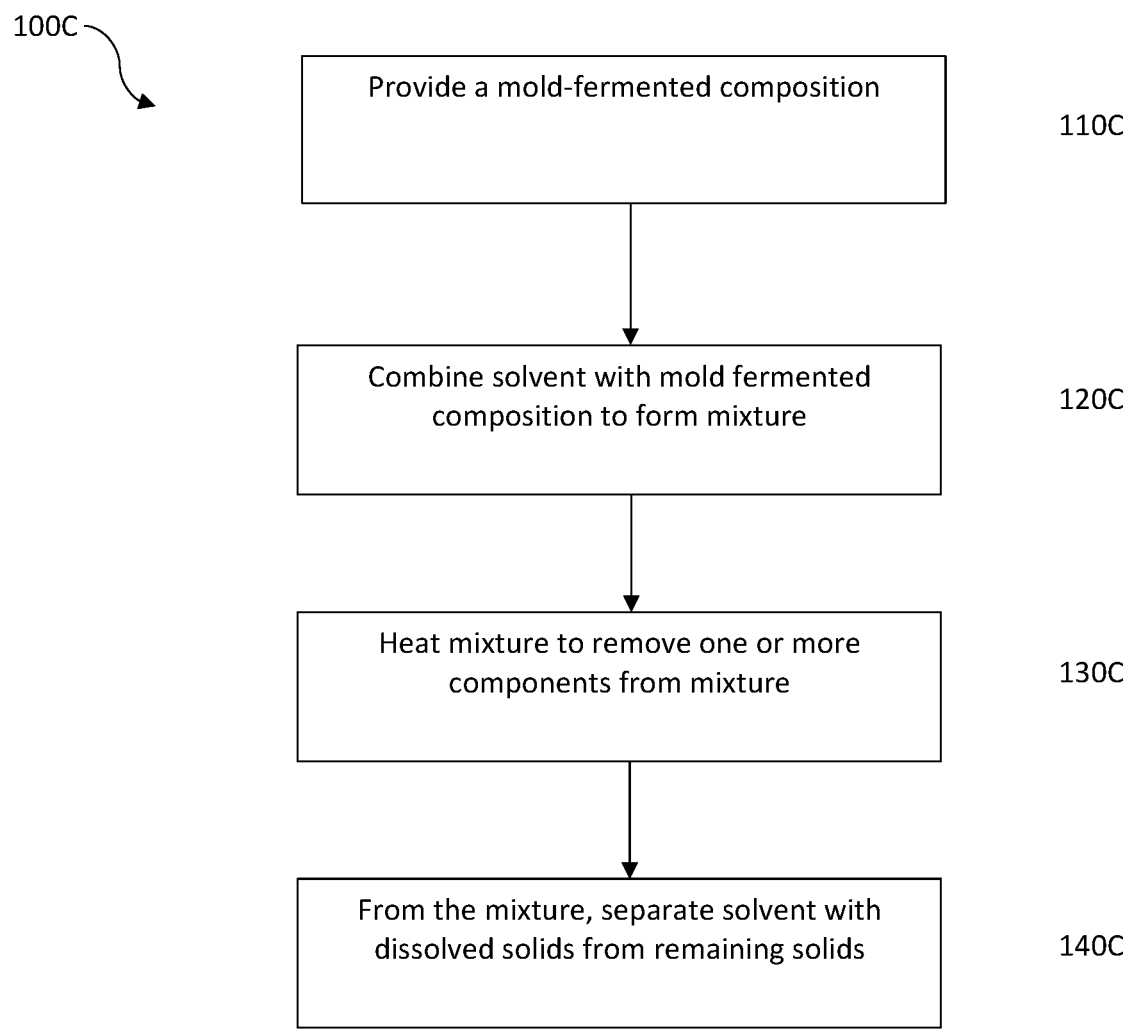
FIG. 1C is a flow chart illustrating a method of separating one or more components from a mold-fermented composition according to various embodiments described herein.

While the method illustrated in FIG. 1B includes both a solvent addition step and a heating step, it should be appreciated that the method can also be carried out using one of the solvent additions steps or the heating step. As shown in FIG. 1G, a method 100G resembles method 100B of FIG. 1B, but eliminates the solvent addition step, such that the method 100G includes a step 110G of providing a mold-fermented composition, a step 120G of separating a first separation stream from the mold-fermented composition, a step 130G of heating the first separation stream to remove one or more components from the first separation stream, and a step 140G of separating liquid with dissolved solids from remaining solids. Similarly, FIG. 1H illustrates a method 100H that resembles the method 100B of FIG. 1B, but eliminates the heating step, such that the method 100H includes a step 110H of providing a mold-fermented composition, a step 120H of separating a first separation stream from the mold-fermented composition, a step 130G of combining solvent with the first separation stream to form a mixture, and a step 140G of separating solvent with dissolved solids from the remaining solids of the mixture.

As noted previously, the mold-fermented composition can be a beverage or a food. When the mold-fermented composition is a food, such as a miso paste, specific techniques may be employed to separate separation components from the mold-fermented food. With reference to FIG. 1C, a method 100C for separating components from a mold-fermented composition, which may be a mold-fermented food, generally comprises a step 110C of providing a mold-fermented composition, a step 120C of combining the mold-fermented composition with a solvent, a step 130C of heating the mixture to remove one or more first undesired components, and a step 140C of separating solvent with dissolved solids from the remaining solids.

Step 110C generally follows the same guidelines as steps 110 discussed in greater detail above, wherein the mold-fermented composition may specifically be a mold-fermented food such as a miso paste. Steps 120C, 130C and 140C generally follow the same guidelines as steps 130B, 140B and 150B discussed in greater detail above.

In step 120C, a solvent is combined with the mold-fermented food composition and the solvent and mold-fermented food composition are mixed together in order to promote interaction between the solvent and the components of the mold-fermented food composition. In some embodiments, the solvent used in step 120C is a solvent that interacts with (e.g., dissolves) the desired components of the mold-fermented food composition. In other embodiments, the solvent can be one that interacts with the undesired components of the mold-fermented food composition. Any suitable solvent can be used, with exemplary though non-limiting solvents including water or an alcohol. The amount of solvent added to the mold-fermented food composition is also generally not limited, and may be used in whatever quantities necessary to provide the desired amount of interaction with the components of the mold-fermented food composition. As noted previously, mixing may be used to promote interaction between the solvent and the components of the mold-fermented food composition, and any suitable mixing techniques or apparatus can be used for any suitable amount of time and at any suitable rate. It should also be appreciated that mixing may not be required.

In step 130C, the mixture of solvent and mold-fermented food composition is heated in order to remove from the mixture one or more undesired components via evaporation. Generally speaking, the heating step 130C can be used to boil off low boiling-point components in the mixture that are not part of the desired final components to be separated from the mold-fermented food composition. The temperature to which the mixture is heated is generally not limited, though the temperature may be closely controlled such that only undesired components are boiled off from the mixture. The temperature used in the heating step may be impacted by the solvent used in step 120C in embodiments where it is desired that the solvent remains in the mixture after the heating step.

Any means of heating the mixture can be used, and the heating can be carried out in one more phases and at one or more temperatures. In some embodiments, modified pressure is used to supplement the heating step and require lower or higher temperatures to boil off the desired components.

In step 140C, the mixture is separated into a solvent fraction (including solid components dissolved therein) a remaining solids fraction of the mixture (i.e., the solids not dissolved in the solvent). Depending on the components of the mixture and the solvent selected, the desired component may be the solids dissolved in the solvent fraction or the solids separated from the solvent fraction. Any suitable separation equipment can be used for carrying out step 140C, and any specific operating parameters that will effectively carry out the desired separation can be used. In the case where the desired component is dissolved solids in the solvent, a further processing step can be carried out to remove the solids from the solvent. In one non-limiting example, centrifugation is used to carry out the separation step 140C.

While the method illustrated in FIG. 1C includes both a solvent addition step and a heating step, it should be appreciated that the method can also be carried out using one of the solvent addition step or the heating step. As shown in FIG. 1I, a method 100I resembles method 100C of FIG. 1C, but eliminates the solvent addition step, such that the method 100I includes a step 110I of providing a mold-fermented composition, a step 120I of heating the mold fermented composition to remove one or more components from the mold fermented composition, and a step 130I of separating liquids with dissolved solids from remaining solids. Similarly, FIG. 1J illustrates a method 100J that resembles the method 100C of FIG. 1C, but eliminates the heating step, such that the method 100J includes a step 110J of providing a mold-fermented composition, a step 120J of combining solvent with the mold-fermented composition to form a mixture, and a step 130J of separating solvent with dissolved solids from the remaining solids of the mixture.

Figure 1D:
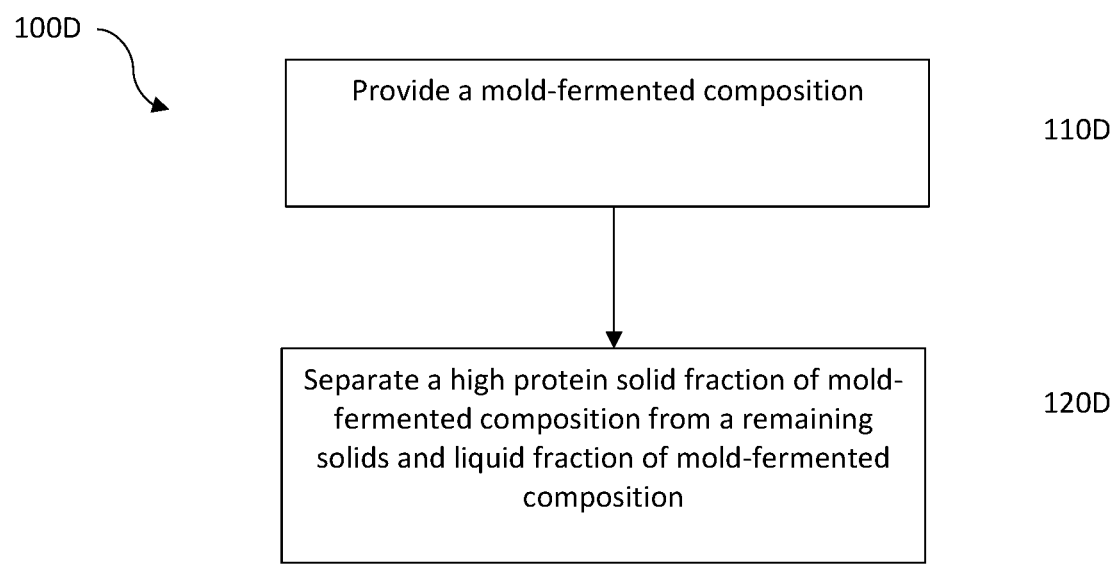
FIG. 1D is a flow chart illustrating a method of separating one or more components from a mold-fermented composition according to various embodiments described herein.

With reference to FIG. 1D, a method 100D for separating components from a mold-fermented composition generally comprises a step 110D of providing an unfiltered mold-fermented composition and a step 120D of separating the mold-fermented composition into a liquid fraction having some solids therein and a solids fraction. While not shown in FIG. 1D, the method 100D can further include an optional heating step before step 120D aimed at boiling off certain components from the mold-fermented composition. Additionally, and as described in greater detail below, the method 100D may also optionally include post-processing carried out on the liquid fraction created in step 120D

Step 110D generally follows the same guidelines as step 110 discussed in greater detail previously. In some embodiments, the mold-fermented composition provided in step 110D is a mold-fermented beverage, such as an unfiltered mold-fermented beverage. Step 120D can be similar or identical to step 150B or step 140C described previously In step 120D, the mold-fermented composition is separated into a solid fraction and a combined solid and liquid fraction. The separation in step 120D is generally designed to separate the mold-fermented composition such that the solid fraction created includes desired components, such as filamentous fungi, which are of greater protein content than the other present solids. The liquid fraction will generally include the liquid component of the mold-fermented composition, but also includes some solids, such as solids of a particular size and/or density such that the solid stay with the liquid fraction after the separation. Any suitable separation equipment can be used for carrying out step 120D provided the above described separation is performed, and any specific operating parameters that will effectively carry out the desired separation can be used. In one non-limiting example, centrifugation is used for separation step 120D

The liquid fraction with solids contained therein created in step 120D may be subjected to further processing. For example, in some embodiments, the liquid fraction is subjected to further separation processes such as filtration in order to separate the solids and the liquids in the liquid containing fraction. Removing the solids from the liquid fraction can produce a final composition, such as a final mold-fermented beverage composition having removed therefrom all solids components traditionally treated as waste. The solids removed from the liquid fraction may generally include waste components, such as non-protein based components that are not targeted by the separation performed in step 120D.

Figure 1E:
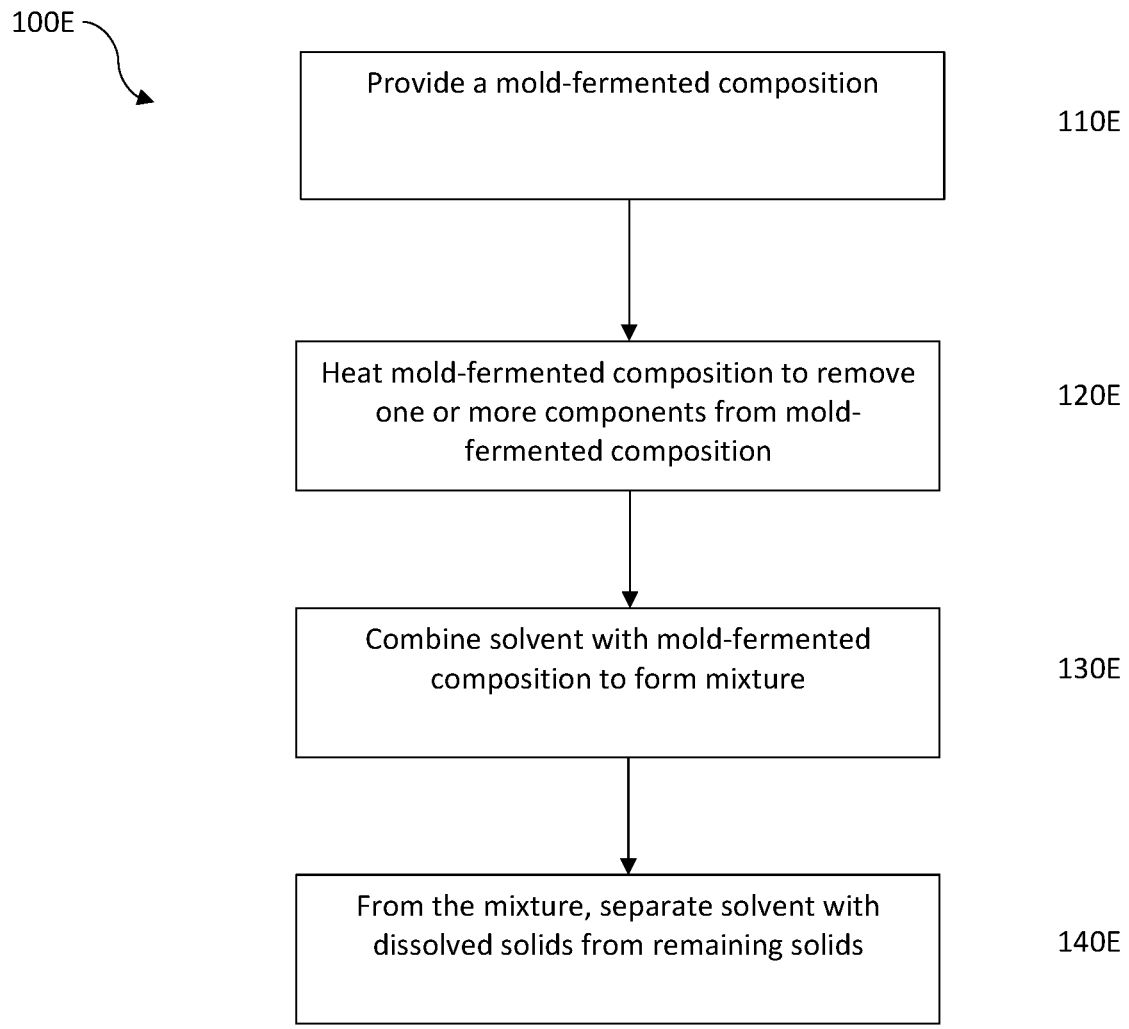
FIG. 1E is a flow chart illustrating a method of separating one or more components from a mold-fermented composition according to various embodiments described herein.
Figure 1F:
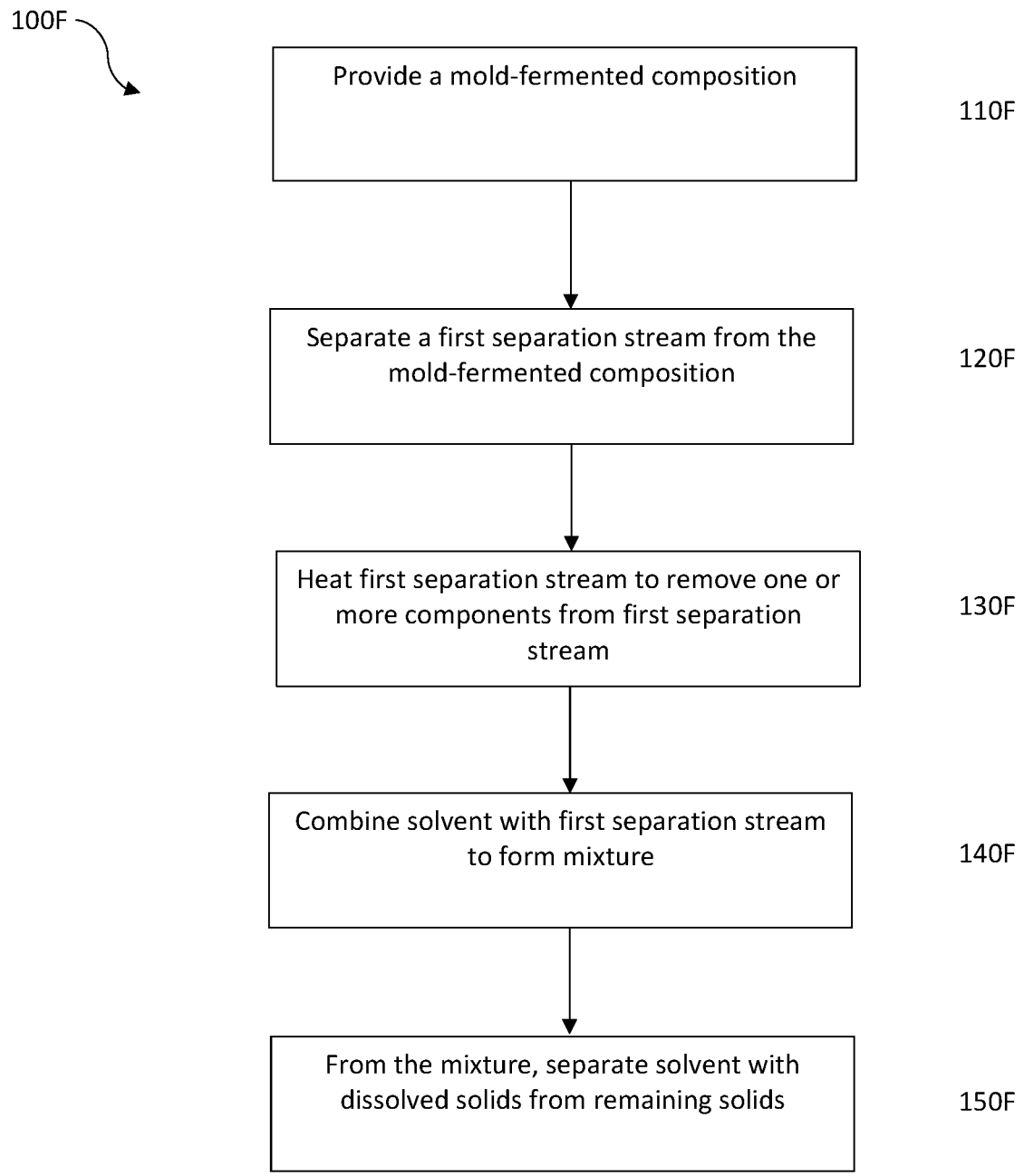
FIG. 1F is a flow chart illustrating a method of separating one or more components from a mold-fermented composition according to various embodiments described herein.
Figure 1G:
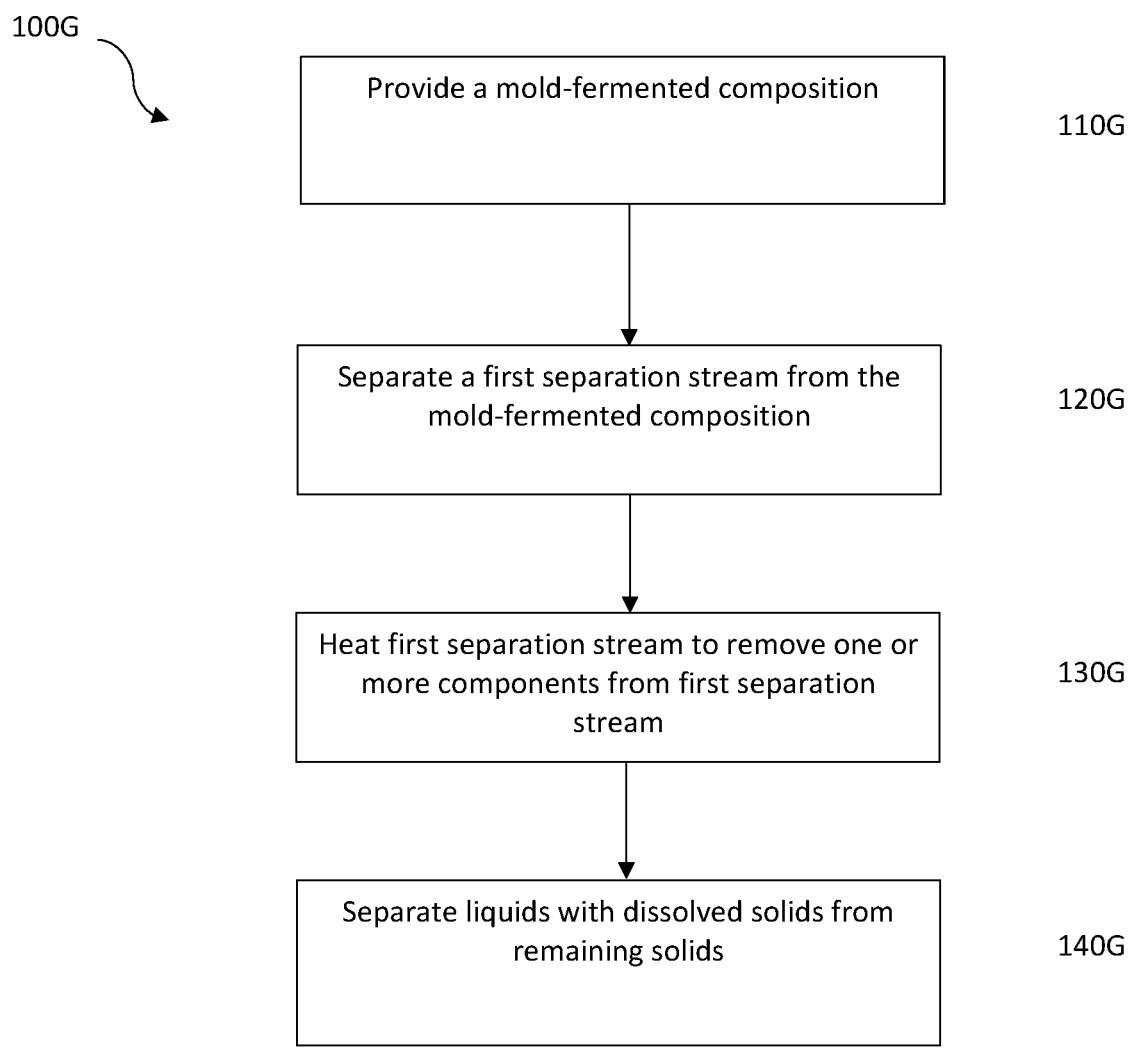
FIG. 1G is a flow chart illustrating a method of separating one or more components from a mold-fermented composition according to various embodiments described herein.
Figure 1H:
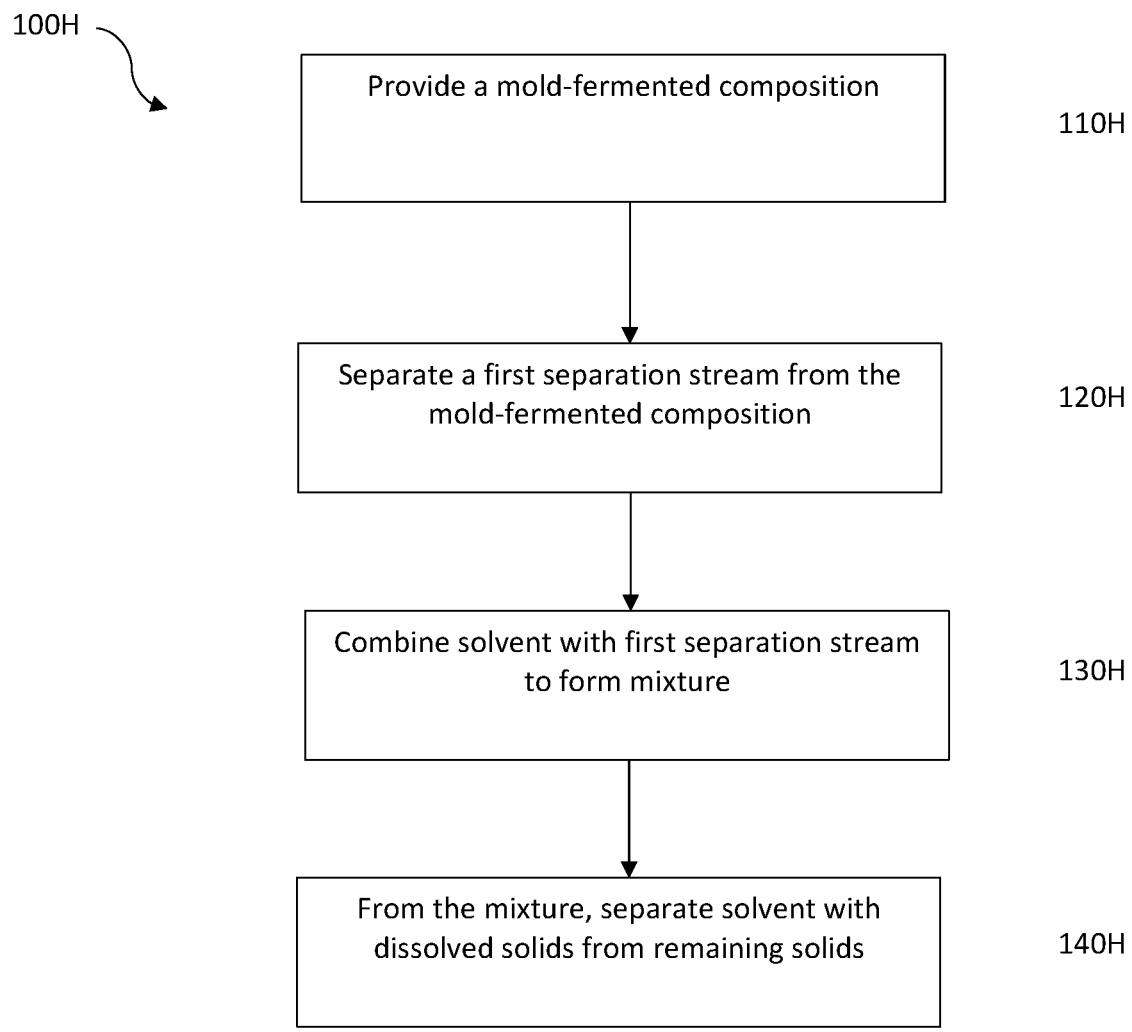
FIG. 1H is a flow chart illustrating a method of separating one or more components from a mold-fermented composition according to various embodiments described herein.
Figure 1I:
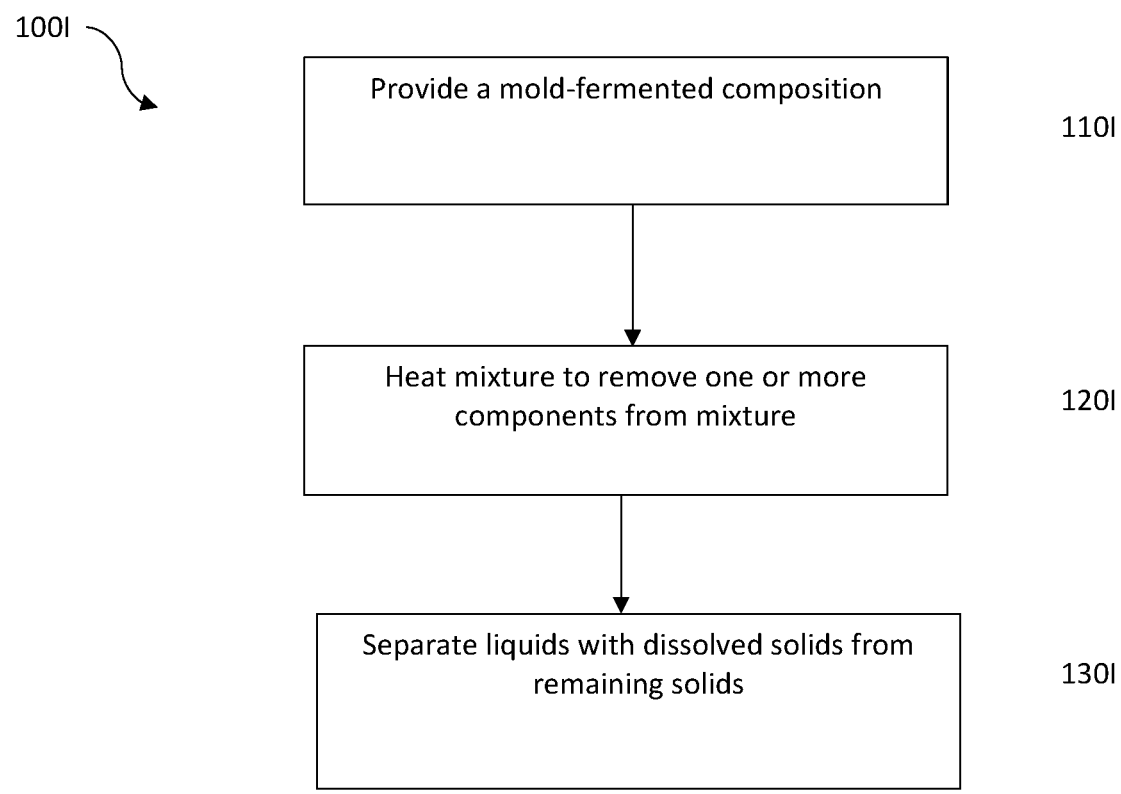
FIG. 1I is a flow chart illustrating a method of separating one or more components from a mold-fermented composition according to various embodiments described herein.
Figure 1J:
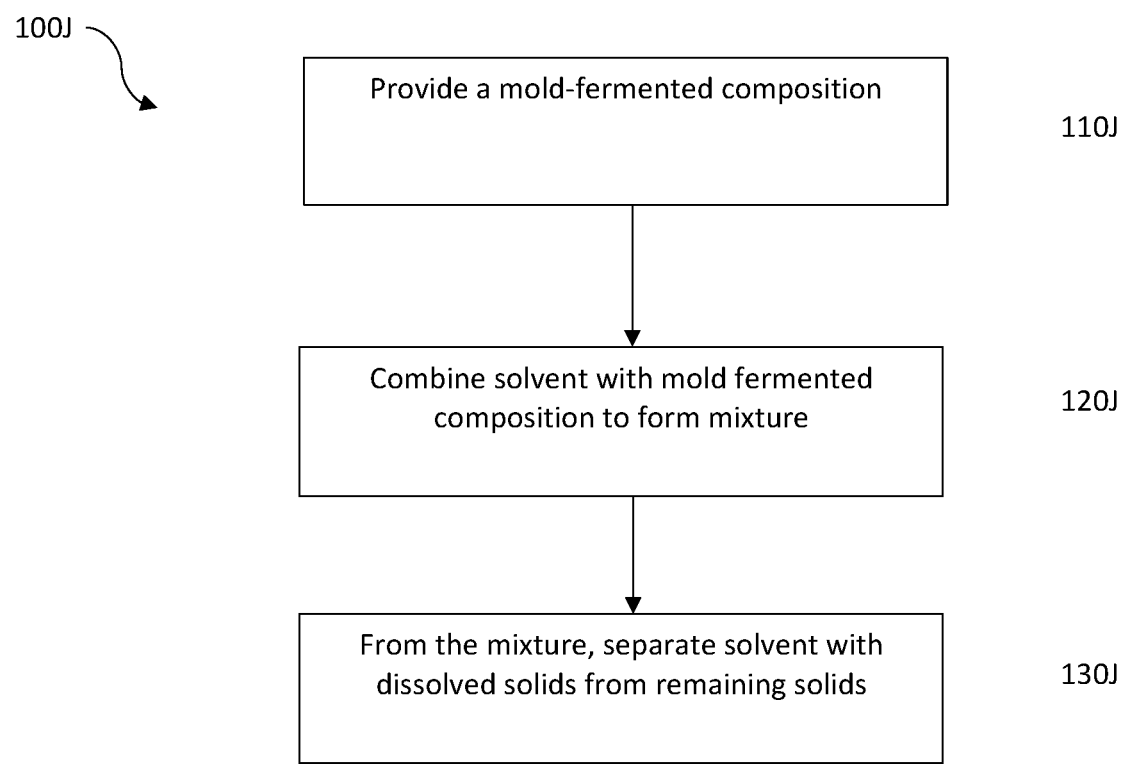
FIG. 1J is a flow chart illustrating a method of separating one or more components from a mold-fermented composition according to various embodiments described herein.

FIGS. 1E and 1F are variations on the methods shown in FIGS. 1C and 1B, respectively, wherein FIGS. 1E and 1F change the order of the solvent addition and heating steps from what is illustrated in FIGS. 1C and 1B. Thus, in FIG. 1E, method 100E includes heating step 120E that is carried out before solvent addition step 130E (as opposed to solvent addition step 120C carried out before heating step 130C in FIG. 1C), and in FIG. 1F, method 100F includes heating step 130F carried out before solvent addition step 140F (as opposed to solvent addition step 130B carried out before heating step 140B in FIG. 1B).

As also noted previously, any specific component of the unfiltered composition or separated stream can be targeted for separation/isolation. In some embodiments, the component separated/isolated is one that has been traditionally considered as having limited to no utility and/or which would otherwise be discarded as waste or given away. Exemplary components that can be targeted for separation/isolation include, but are not limited to, filamentous fungus, yeast, starch, or residual free undigested protein (such as rice protein). In some embodiments, one or more high-protein components are targeted for separation and/or isolation to thereby create a separated/isolated composition that is high in protein content and which has a higher concentration of protein as compared to the composition from which the high protein components were separated/isolated. In some embodiments, the separated composition is greater than 55 wt. % protein on a dry weight basis (i.e., when liquid is removed from the separated composition). In other embodiments, the protein content of the separated composition on a dry weight basis is greater than 35 wt. %, greater than 40 wt. %, greater than 45 wt. %, greater than 50 wt. %, greater than 60 wt. %, greater than 65 wt. %, greater than 70 wt. %, greater than 75 wt. %, or greater than 80 wt. %.

The separation/isolation of can also be carried out such that the protein content percentage of the separated composition is increased by a certain percentage as compared to the protein content percentage of the material from which the separated material is separated, with the protein content percentages being on a wt. % of a dry weight basis. In some embodiments, the percentage increase of the protein content percentage from the mold-fermented composition immediately prior to separation to the separated material (protein content percentage being a wt. % on a dry weight basis) is at least a 150% increase, at least a 160% increase, at least a 170% increase, at least a 180% increase, at least a 190% or at least a 200% increase. For example, a mold-fermented composition immediately prior to separation of the separation material may have a protein content percentage of 30 wt. % on a dry weight basis of the mold-fermented composition. After the separation described herein, the separation material may have a protein content percentage of 55 wt. % on a dry weight basis of the separated material, which represents a 183% increase in protein content percentage.

The separation/isolation can also be carried out such that the alcohol content of the separated material is low. In other words, where the initial mold-fermented composition from which a separation material is separated is an alcohol-containing mold-fermented composition, the separation can be carried out such that the separation material separated from the alcohol-containing mold-fermented composition includes very little of the alcohol from the alcohol-containing mold-fermented composition and is therefore low in alcohol content. In some embodiments, the alcohol content of the separated material is less than 5 wt. % alcohol, less than 4 wt. % alcohol, less than 3 wt. % alcohol, less than 2 wt. % alcohol, or less than 1 wt. % alcohol.

The separation/isolation of separation components from the unfiltered composition or separated stream can be carried out to various purity levels. For example, in some embodiments, the specific component is separated/isolated such that the targeted component is greater than about 1 wt. %, greater than about 5 wt. %, greater than about 10 wt. %, greater than about 15 wt. %, greater than about 20 wt. %, greater than about 25 wt. %, greater than about 30 wt. %, greater than about 35 wt. %, greater than about 40 wt. %, greater than about 45 wt. %, greater than about 50 wt. %, greater than about 55 wt. %, greater than about 60 wt. %, greater than about 65 wt. %, greater than about 70 wt. %, greater than about 75 wt. %, greater than about 80 wt. %, greater than about 85 wt. %, greater than about 90 wt. %, greater than about 95 wt. %, or about 100 wt. % of the separated material. The remainder of the components in the separated stream can be any other material in the unfiltered composition or separated stream, including other separated components such as starch and yeast. The purity level of the targeted component in the separated stream can vary based on the specific component being targeted for separation. For example, the purity level of filamentous fungus in a separated stream when filamentous fungus is targeted for separation may be greater or less than the purity level of another component (e.g., starch) in a separated stream when the other component is target for separation.

With specific reference to FIG. 1A and method 100A, wherein a separation stream is separated from the pre-final form mold-fermented composition and then one or more components are separated from the separation stream, the above description describes the separation of one or more components from the separation stream. However, it should be appreciated that the desired components can also be isolated by removing other components from the separation stream and thereby leaving behind the desired components. In other words, one or more components can be removed from the separation stream such that what remains in the separation stream is the desired component or components and the separation stream effectively becomes the one or more desired components. In one specific non-limiting example of this type of separation, the separation stream may include an alcohol component in addition to one or more desired components, and the separation stream may be treated such that the alcohol component is removed from the separation stream to thereby leave behind the one or more desired components. In such embodiments, the alcohol component of the separation stream can be separated via boiling and/or membrane separation, though other suitable methods for removing alcohol from the separation stream can be used. This method of removing one or more components from the separation stream to leave behind in the separation stream the one or more desired components can be specifically applicable to sake kasu separated from sake as a separation stream and the removal of alcohol from the sake kasu to thereby leave behind in the sake kasu the desired components (e.g., filamentous fungi).

As noted above, various separation techniques can be used in any order and in any combination. Thus, in some embodiments involving multiple separation steps, the method may include steps wherein a component of the separation stream is removed from the separation stream to thereby leave in the separation stream the desired components, followed by steps to separate a further desired component or collection of components.

Once separated/isolated, the component or components can be incorporated into a variety of different products to thereby provide beneficial high value use of components previously considered as waste and discarded as such. The specific use for the component can depend on the specific component separated, though generally speaking, the components that are high in protein can be useful for products such as alternative meats, other food for human consumption (e.g., protein fortified foods such as protein bars), or as high quality animal or pet feed. Other separated components can be used as feed stock for other fermentation processes, food treatment, cosmetics, and chemical processes.

In embodiments where filamentous fungus is separated from the unfiltered composition or separated stream, a particularly beneficial use of the filamentous fungus in the production of alternative meats. As used herein, the term "alternative meats" generally means a combination of flavors, fats, binders and protein combined to mimic the texture, flavor, and nutrition of meat (including seafood). Alternative meats are also sometimes referred to as meat analogues or meat mimetics. Filamentous fungus serves as an excellent base protein for alternative meats for a variety of reasons discussed in greater detail below. The amount of filamentous fungus used as the base protein in alternative meats is generally not limited. In some embodiments, the filamentous fungus is used as the sole protein base on the alternative meat, although in other embodiments, the filamentous fungus can be used in conjunction with other proteins and/or food ingredients (e.g., fats, oils, etc.).

Filamentous fungus separated from unfiltered mold-fermented compositions is well suited for use in preparing alternative meats because at a microstructure level, it is approximately the same size as animal muscle fibers. This means filamentous fungus has a texture similar to meat when arranged in a complex matrix. Also, because the fungus is filamentous, the hyphae forms in strands that resemble meat. In contrast, plant based material is generally not able to achieve the same texture at the microstructure level as meat, and therefore is less suitable for alternative meats than filamentous fungus.

Filamentous fungus separated from unfiltered mold-fermented compositions also has a generally neutral taste after utilizing the separation methods described herein to e.g., remove volatile flavor components present from the initial fermentation process. As such, when incorporated into an alternative meat including flavoring provided to mimic the taste of meat, the filamentous fungus does not negatively impact the specially designed flavoring used to create a meat-like taste (typically including hydrolyzed vegetable proteins, yeast-based extracts, and other natural flavors, and/or artificial flavors). Any taste masking required to mask the taste of the filamentous fungus and allow the other flavoring to provide a meat-like taste is minimal or not required at all. The filamentous fungus is also slightly savory, again making it more complimentary for use in alternative meats and as base protein source. This is in contrast to plant-based proteins, which have a very strong taste that needs to be masked in order to not over-power the other flavoring provided to create a meat-like taste.

Use of filamentous fungus separated from unfiltered compositions or separated streams in alternative meats also provides nutritional benefits. For example, filamentous fungus does not include any cholesterol. Filamentous fungus also provides complete protein (i.e., complete amino acid profile). Filamentous fungus also includes many micronutrients and is a source of beta glucans (prebiotic fiber).

Cost and efficiency benefits are also achieved through the use of filamentous fungus separated from unfiltered compositions or separation streams. Animal based meats are highly inefficient for producing meat/protein for human consumption, as an animal has to eat food, drink water, and expend energy to grow mass. In addition, animals breathe out carbon dioxide and produce methane, both of which can pollute the air. Plant-based meats are generally better than animal-based meats from a cost and efficiency perspective, since often the plants that are being used are nitrogen fixing and they intake carbon dioxide. However, in the processing of plant-based proteins to make protein concentrates or protein isolates, a large quantity of the plant biomass is wasted. In contrast, alternative meats using filamentous fungi are extremely efficient, especially when the filamentous fungus is salvaged from the production of mold-fermented beverages. This filamentous fungus would otherwise be treated as a waste product, but instead is used to make alternative meat that is extremely nutrient dense and high in protein.

With respect to food safety, it is noted facilities used to process meat from an animal are considered extremely unsanitary. In contrast, fermentation processes are carried out in a clean (and often predominantly sterile) environment. As such, the process of refining and making meat alternatives incorporating filamentous fungus separated from mold-fermented compositions can be done in a sterile environment with critical control points to ensure that contaminants are kept to a minimum.

Components separated from unfiltered mold-fermented compositions or from separated streams can also be used in other food products designed for human consumption. For example, where the separated component is filamentous fungus or other high protein components of the fermented material such as residual undigested protein or yeast, the high protein neutral tasting material can be used as a protein base for any high protein product including food products where low moisture, moderate moisture, high moisture or no moisture is required. In some embodiments, the separated high protein component or components can be formulated or processed into a powder to make a protein powder suitable for use in making high protein food products or as a supplement or fortification ingredient in food designed for human consumption. Non-limiting examples of other food products into which separated components can be incorporated include protein bars or chips.

In embodiments where starch is the separated component, the starch can be used in a variety of products. For example, separated starch component can be used anywhere high moisture starch solution is required, or dried into a flour. In a specific example, separated starch can be used to make flour, which can subsequently be used to make baked goods and other food requiring flour as an ingredient. In embodiments where yeast is the separated component, the yeast can be used in a variety of products.

In addition to incorporation into food designed for human consumption, the separated components, such as filamentous fungus or starch, can also be incorporated into animal or pet feed. Both animal and pet feed can generally require starch and/or protein, and the components separated from unfiltered beverage or separated stream can supply this material. For example, some animal feeds may require high protein content, which can be better supplied by separated filamentous fungus than plant-based proteins due to the more neutral taste and the inclusion of micronutrients found in separated filamentous fungus.

In other embodiments, components separated from unfiltered mold-fermented compositions or separated stream can be used to provide feed stock for other fermentation processes.

In some embodiments, separated components include functional enzymes or purified chemicals. These components have a variety of uses, including for treating and/or processing food, making cosmetics, and chemical processes.

Other products in which separated components can be incorporated include health supplements, beauty products, functional ingredients (e.g., through transformation of starches), bioactive compounds, fortification/nutrition supplement, flavor compounds, etc.

As noted above, the present disclosure is related to the separation of components from mold-fermented compositions and the use of these separated components in various products, and the mold-fermented compositions can include either food or beverage products. Soy sauce, tempeh and miso paste are just a few examples of food products that utilize mold fermentation in their production and which are therefore suitable for use in the methods described herein. In some embodiments, these food products include filamentous fungus and other components during at least some portion of their production. As such, separation techniques such as those described herein are equally applicable to food products and beverage products in order to separate relatively highly concentrated amounts of one or more components from the food or beverage compositions.

With respect to soy sauce and miso paste, both food products employ *Aspergillus oryzae* as a mold in a fermentation step used in the production of these food products. As such, specialized separation techniques such as those described above can be used to specifically target and separate filamentous fungus from the soy sauce or miso paste. Other components traditionally removed from soy sauce and miso paste as waste components can also be targeted for separation using separation techniques described herein. Once separated from food products, components such as filamentous fungus can be used in alternative meats, other food products (e.g., high protein food products), animal feed, pet food, etc., as described in greater detail above with respect to the use of components separated from mold-fermented beverages.

The production of tempeh requires fermentation of soybeans using *Rhizopus* spp. molds. Accordingly, tempeh and similar solid food products that use fermentation in their production can also be subjected to the specialized separation techniques described herein so that various components used in the production process can be separated. In the case of tempeh, filamentous fungus is just one example of a component that can be targeted for separation during the tempeh production process. Due to the solid state nature of tempeh, additional techniques may need to be employed in order to separate components from the tempeh during the production process.

EXEMPLARY EMBODIMENTS

The following is a non-limiting, non-exhaustive list of exemplary embodiments and aspects of the various technologies described herein.

Embodiment 1

A method of separating one or more components from a mold-fermented composition, comprising:
  providing a mold-fermented composition;
  separating a first separation composition from the mold-fermented composition during the process of producing the final mold-fermented composition; and
  isolating or separating a second separation composition from the first separation composition, the second separation composition comprising one or more separation components;
  wherein the one or more separation components are selected from the group consisting of mold, starch, yeast, residual undigested protein, or a combination thereof.

The method of any aspect or aspects of Embodiment 1, wherein the mold-fermented composition is a mold-fermented beverage.

The method of any aspect or aspects of Embodiment 1, wherein the mold-fermented beverage is sake and the first separation composition is sake kasu, or the mold-fermented beverage is mirin and the first separation composition is mirin kasu.

The method of any aspect or aspects of Embodiment 1, wherein the mold-fermented composition is a mold-fermented food.

The method of any aspect or aspects of Embodiment 1, wherein the mold-fermented food is soy sauce, and the first separation composition is shoyu kasu.

The method of any aspect or aspects of Embodiment 1, wherein at least one of the one or more separation components is filamentous fungus.

The method of any aspect or aspects of Embodiment 1, wherein isolating or separating the second separation composition from the first separation material comprises:
  mixing the first separation composition with a solvent;
  heating the mixture of the first separation composition and solvent to evaporate one or more volatile components from the mixture; and
  separating the mixture into a liquid fraction and a solid fraction, wherein the one or more separation components are part of the solid fraction.

The method of any aspect or aspects of Embodiment 1, wherein isolating or separating the second separation composition from the first separation composition comprises:
  mixing the first separation composition with a solvent; and
  separating the mixture into a liquid fraction and a solid fraction, wherein the one or more separation components are part of the solid fraction The method of any aspect or aspects of Embodiment 1, wherein isolating or separating the second separation composition from the first composition comprises:
  heating the first separation composition to evaporate one or more volatile components from the mixture; and
  separating the first separation composition into a liquid fraction and a solid fraction, wherein the one or more separation components are part of the solid fraction.

The method of any aspect or aspects of Embodiment 1, wherein isolating or separating the second separation composition from the first separation material comprises:
  heating the first separation composition to evaporate one or more volatile components from the mixture;
  mixing the first separation composition with a solvent; and
  separating the mixture into a liquid fraction and a solid fraction, wherein the one or more separation components are part of the solid fraction.

The method of any aspect or aspects of Embodiment 1, wherein isolating or separating the second separation composition from the first separation composition comprises:
  removing an alcohol content from the first separation composition.

The method of any aspect or aspects of Embodiment 1, wherein removing the alcohol content from the first separation composition comprises boiling alcohol out of the first separation composition, separating alcohol from the first separation composition by passing the first separation composition through a selective membrane, or a combination thereof.

The method of any aspect or aspects of Embodiment 1, wherein second separation composition has a protein content greater than 55 wt. % on a dry weight basis.

Embodiment 2

A food product comprising:
  a second separation composition comprising one or more separation components, the second separation composition produced by:
    providing a mold-fermented composition;
    separating a first separation composition from the mold-fermented composition during the process of producing the mold-fermented composition; and
    isolating or separating the second separation composition from the first separation composition;
    wherein the one or more separation components are selected from the group consisting of mold, starch, yeast, residual undigested protein, or a combination thereof.

The food product of any aspect or aspects of Embodiment 1 or Embodiment 2, wherein the one or more components comprise filamentous fungus.

The food product of aspect or aspects of Embodiment 1 or Embodiment 2, wherein the mold-fermented composition is a mold-fermented beverage.

The food product of aspect or aspects of Embodiment 1 or Embodiment 2 wherein the mold-fermented beverage is sake and the first separation composition is sake kasu, or the mold-fermented beverage is mirin and the first separation composition is mirin kasu.

The food product of aspect or aspects of Embodiment 1 or Embodiment 2, wherein the mold-fermented composition is a mold-fermented food.

The food product of aspect or aspects of Embodiment 1 or Embodiment 2, wherein the mold-fermented food is soy sauce and the first separation material is shoyu kasu.

The food product of aspect or aspects of Embodiment 1 or Embodiment 2, wherein the food product is a meat or seafood alternative or analogue food product.

The food product of aspect or aspects of Embodiment 1 or Embodiment 2, wherein the food product is a food product formulated for human consumption.

The food product of aspect or aspects of Embodiment 1 or Embodiment 2, wherein the food product is an animal feed or a pet food.

The food product of aspect or aspects of Embodiment 1 or Embodiment 2, wherein the food product is protein-containing powder.

Embodiment 3

A method of separating one or more components from a mold-fermented composition, comprising:
 providing a mold-fermented composition; and
 separating a separation composition from the mold-fermented composition, the separation composition comprising one or more separation components;
 wherein the one or more separation components are selected from the group consisting of mold, starch, yeast, residual undigested protein, or a combination thereof; and
 wherein the separation composition has a protein content greater than 35%, greater than 40%, greater than 45%, greater than 50%, greater than 55%, or greater than 60% protein on a dry weight basis of the second separation composition.

The method of any aspect or aspects of Embodiment 3, wherein the mold-fermented composition is a mold-fermented beverage.

The method of any aspect or aspects of Embodiment 3, wherein the mold-fermented beverage is sake, mirin, sochu, or soju.

The method of any aspect or aspects of Embodiment 3, wherein the mold-fermented composition is a mold-fermented food.

The method of any aspect or aspects of Embodiment 3, wherein the mold-fermented food is soy sauce.

The method of any aspect or aspects of Embodiment 3, wherein at least one of the one or more separation components is filamentous fungus.

The method of any aspect or aspects of Embodiment 3, wherein separating the separation composition from the mold-fermented composition comprises:
 separating a solid fraction comprising one or more separation components from a remaining solids and liquid fraction;
 wherein the separated solids fraction is higher in protein content than the solids portion of the remaining solids and liquid fraction.

The method of any aspect or aspects of Embodiment 3, wherein separating the separation composition from the mold-fermented composition comprises:
 mixing the mold-fermented composition with a solvent;
 heating the mixture of the mold-fermented composition and solvent to evaporate one or more volatile components from the mixture; and
 separating the mixture into a liquid fraction and a solid fraction, wherein the one or more separation components are part of the solid fraction.

The method of any aspect or aspects of Embodiment 3, wherein separating the separation composition from the mold-fermented composition comprises:
 heating the mold-fermented composition to evaporate one or more volatile components from the mixture; and
 separating the mold-fermented composition into a liquid fraction and a solid fraction, wherein the one or more separation components are part of the solid fraction.

The method of any aspect or aspects of Embodiment 3, wherein separating the separation composition from the mold-fermented composition comprises:
 mixing the mold-fermented composition with a solvent;
 separating the mixture into a liquid fraction and a solid fraction, wherein the one or more separation components are part of the solid fraction.

The method of any aspect or aspects of Embodiment 3, wherein separating the separation composition from the mold-fermented composition comprises:
 heating the mold-fermented composition to evaporate one or more volatile components from the mixture;
 mixing the mold-fermented composition with a solvent; and
 separating the mixture into a liquid fraction and a solid fraction, wherein the one or more separation components are part of the solid fraction.

Embodiment 4

A food product comprising:
 a separation composition comprising one or more separation components, the separation composition produced by:
  providing a mold-fermented composition; and
  separating the separation composition from the mold-fermented composition, the separation composition comprising one or more separation components;
  wherein the one or more separation components are selected from the group consisting of mold, starch, yeast, residual undigested protein, or a combination thereof; and
  wherein the separation composition has a protein content greater than 35%, greater than 40%, greater than 45%, greater than 50%, greater than 55%, or greater than 60% protein on a dry weight basis of the second separation composition.

The food product of any aspect or aspects of Embodiment 3 or Embodiment 4, wherein the one or more components comprise filamentous fungus.

The food product of any aspect or aspects of Embodiment 3 or Embodiment 4, wherein the mold-fermented composition is a mold-fermented beverage.

The food product of any aspect or aspects of Embodiment 3 or Embodiment 4, wherein the mold-fermented beverage is sake and the first separation composition is sake kasu, or the mold-fermented beverage is mirin and the first separation composition is mirin kasu.

The food product of any aspect or aspects of Embodiment 3 or Embodiment 4, wherein the mold-fermented composition is a mold-fermented food.

The food product of any aspect or aspects of Embodiment 3 or Embodiment 4, wherein the mold-fermented food is soy sauce, and the first separation material is shoyu kasu.

The food product of any aspect or aspects of Embodiment 3 or Embodiment 4, wherein the food product is a meat or seafood alternative or analogue food product.

The food product of any aspect or aspects of Embodiment 3 or Embodiment 4, wherein the food product is a food product formulated for human consumption.

The food product of any aspect or aspects of Embodiment 3 or Embodiment 4, wherein the food product is an animal feed or a pet food.

The food product of any aspect or aspects of Embodiment 3 or Embodiment 4, wherein the food product is protein-containing powder.

Embodiment 5

A method of separating one or more components from a mold-fermented composition, comprising:
  providing a mold-fermented composition; and
  separating a separation composition from the mold-fermented composition, the separation composition comprising one or more separation components;
  wherein the one or more separation components are selected from the group consisting of mold, starch, yeast, residual undigested protein, or a combination thereof; and
  wherein the separation composition has a protein content percentage as measured on a dry weight basis, the protein content percentage of the separation composition being at least 150%, at least 160%, at least 170%, at least 180%, at least 190% or at least 200% of the protein content percentage as measure by dry weight basis of the original mold-fermented composition immediately prior to separating the separation composition from the mold-fermented composition.

The method of any aspect or aspects of Embodiment 5, wherein the mold-fermented composition is a mold-fermented beverage.

The method of any aspect or aspects of Embodiment 5, wherein the mold-fermented beverage is sake, mirin, sochu or soju.

The method of any aspect or aspects of Embodiment 5, wherein the mold-fermented composition is a mold-fermented food.

The method of any aspect or aspects of Embodiment 5, wherein the mold-fermented food is soy sauce.

The method of any aspect or aspects of Embodiment 5, wherein at least one of the one or more separation components is filamentous fungus.

The method of any aspect or aspects of Embodiment 5, wherein separating the separation composition from the mold-fermented composition comprises:
  separating a solid fraction comprising one or more separation components from a remaining solids and liquid fraction;
  wherein the separated solids fraction is higher in protein content than the solids portion of the remaining solids and liquid fraction.

The method of any aspect or aspects of Embodiment 5, wherein separating the separation composition from the mold-fermented composition comprises:
  mixing the mold-fermented composition with a solvent;
  heating the mixture of the mold-fermented composition and solvent to evaporate one or more volatile components from the mixture; and
  separating the mixture into a liquid fraction and a solid fraction, wherein the one or more separation components are part of the solid fraction.

The method of any aspect or aspects of Embodiment 5, wherein separating the separation composition from the mold-fermented composition comprises:
  heating the mold-fermented composition to evaporate one or more volatile components from the mixture; and
  separating the mold-fermented composition into a liquid fraction and a solid fraction, wherein the one or more separation components are part of the solid fraction.

The method of any aspect or aspects of Embodiment 5, wherein separating the separation composition from the mold-fermented composition comprises:
  mixing the mold-fermented composition with a solvent;
  separating the mixture into a liquid fraction and a solid fraction, wherein the one or more separation components are part of the solid fraction.

The method of any aspect or aspects of Embodiment 5, wherein separating the separation composition from the mold-fermented composition comprises:
  heating the mold-fermented composition to evaporate one or more volatile components from the mixture;
  mixing the mold-fermented composition with a solvent; and
  separating the mixture into a liquid fraction and a solid fraction, wherein the one or more separation components are part of the solid fraction.

Embodiment 6

A food product comprising:
  a separation composition comprising one or more separation components, the separation composition produced by:
  providing a mold-fermented composition; and
  separating the separation composition from the mold-fermented composition, the separation composition comprising one or more separation components;
  wherein the one or more separation components are selected from the group consisting of mold, starch, yeast, residual undigested protein, or a combination thereof; and
  wherein the separation composition has a protein content percentage as measured on a dry weight basis, the protein content percentage of the separation composition being at least 150%, at least 160%, at least 170%, at least 180%, at least 190% or at least 200% of the protein content percentage as measure by dry weight basis of the original mold-fermented composition immediately prior to separating the separation composition from the mold-fermented composition.

The food product of any aspect or aspects of Embodiment 5 or Embodiment 6, wherein the one or more components comprise filamentous fungus.

The food product of any aspect or aspects of Embodiment 5 or Embodiment 6, wherein the mold-fermented composition is a mold-fermented beverage.

The food product of any aspect or aspects of Embodiment 5 or Embodiment 6, wherein the mold-fermented beverage is sake and the first separation composition is sake kasu, or the mold-fermented beverage is mirin and the first separation composition is mirin kasu.

The food product of any aspect or aspects of Embodiment 5 or Embodiment 6, wherein the mold-fermented composition is a mold-fermented food.

The food product of any aspect or aspects of Embodiment 5 or Embodiment 6, wherein the mold-fermented food is soy sauce, and the first separation material is shoyu kasu.

The food product of any aspect or aspects of Embodiment 5 or Embodiment 6, wherein the food product is a meat or seafood alternative or analogue food product.

The food product of any aspect or aspects of Embodiment 5 or Embodiment 6, wherein the food product is a food product formulated for human consumption.

The food product of any aspect or aspects of Embodiment 5 or Embodiment 6, wherein the food product is an animal feed or a pet food.

The food product of any aspect or aspects of Embodiment 5 or Embodiment 6, wherein the food product is protein-containing powder.

Embodiment 7

A method of separating one or more components from a mold-fermented composition, comprising:
provi ding a mold-fermented composition; and
separating a separation composition from the mold-fermented composition, the separation composition comprising one or more separation components;
wherein the one or more separation components are selected from the group consisting of mold, starch, yeast, residual undigested protein, or a combination thereof; and
wherein the separation composition has an alcohol content of less than 5 wt. %, less than 4 wt. %, less than 3 wt. %, less than 2 wt. % or less than 1 wt. %.

The method of any aspect or aspects of Embodiment 7, wherein the mold-fermented composition is a mold-fermented beverage.

The method of any aspect or aspects of Embodiment 7, wherein the mold-fermented beverage is sake, mirin, sochu, or soju.

The method of any aspect or aspects of Embodiment 7, wherein the mold-fermented composition is a mold-fermented food.

The method of any aspect or aspects of Embodiment 7, wherein the mold-fermented food is soy sauce.

The method of any aspect or aspects of Embodiment 7, wherein at least one of the one or more separation components is filamentous fungus.

The method of any aspect or aspects of Embodiment 7, wherein separating the separation composition from the mold-fermented composition comprises:
separating a solid fraction comprising one or more separation components from a remaining solids and liquid fraction;
wherein the separated solids fraction is higher in protein content than the solids portion of the remaining solids and liquid fraction.

The method of any aspect or aspects of Embodiment 7, wherein separating the separation composition from the mold-fermented composition comprises:
mixing the mold-fermented composition with a solvent;
heating the mixture of the mold-fermented composition and solvent to evaporate one or more volatile components from the mixture; and
separating the mixture into a liquid fraction and a solid fraction, wherein the one or more separation components are part of the solid fraction.

The method of any aspect or aspects of Embodiment 7, wherein separating the separation composition from the mold-fermented composition comprises:
heating the mold-fermented composition to evaporate one or more volatile components from the mixture; and
separating the mold-fermented composition into a liquid fraction and a solid fraction, wherein the one or more separation components are part of the solid fraction.

The method of any aspect or aspects of Embodiment 7, wherein separating the separation composition from the mold-fermented composition comprises:
mixing the mold-fermented composition with a solvent;
separating the mixture into a liquid fraction and a solid fraction, wherein the one or more separation components are part of the solid fraction.

The method of any aspect or aspects of Embodiment 7, wherein separating the separation composition from the mold-fermented composition comprises:
heating the mold-fermented composition to evaporate one or more volatile components from the mixture;
mixing the mold-fermented composition with a solvent; and
separating the mixture into a liquid fraction and a solid fraction, wherein the one or more separation components are part of the solid fraction.

Embodiment 8

A food product comprising:
a separation composition comprising one or more separation components, the separation composition produced by:
providing a mold-fermented composition; and
separating the separation composition from the mold-fermented composition, the separation composition comprising one or more separation components;
wherein the one or more separation components are selected from the group consisting of mold, starch, yeast, residual undigested protein, or a combination thereof; and
wherein the separation composition has an alcohol content of less than 5 wt. %, less than 4 wt. %, less than 3 wt. %, less than 2 wt. % or less than 1 wt. %.

The food product of any aspect or aspects of Embodiment 7 or Embodiment 8, wherein the one or more components comprise filamentous fungus.

The food product of any aspect or aspects of Embodiment 7 or Embodiment 8, wherein the mold-fermented composition is a mold-fermented beverage.

The food product of any aspect or aspects of Embodiment 7 or Embodiment 8, wherein the mold-fermented beverage is sake and the first separation composition is sake kasu, or the mold-fermented beverage is mirin and the first separation composition is mirin kasu.

The food product of any aspect or aspects of Embodiment 7 or Embodiment 8, wherein the mold-fermented composition is a mold-fermented food.

The food product of any aspect or aspects of Embodiment 7 or Embodiment 8, wherein the mold-fermented food is soy sauce, and the first separation material is shoyu kasu.

The food product of any aspect or aspects of Embodiment 7 or Embodiment 8, wherein the food product is a meat or seafood alternative or analogue food product.

The food product of any aspect or aspects of Embodiment 7 or Embodiment 8, wherein the food product is a food product formulated for human consumption.

The food product of any aspect or aspects of Embodiment 7 or Embodiment 8, wherein the food product is an animal feed or a pet food.

The food product of any aspect or aspects of Embodiment 7 or Embodiment 8, wherein the food product is protein-containing powder.

Unless otherwise indicated, all numbers and expressions, such as those expressing dimensions, physical characteristics, etc., used in the specification (other than the claims) are understood as modified in all instances by the term "approximately" or "about". At the very least, and not as an attempt to limit the application of the doctrine of equivalents to the claims, each numerical parameter recited in the specification or claims which is modified by the term "approximately" or "about" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all subranges or individual values that are between and/or inclusive of the minimum value of 1 or more and ending with a maximum value of 10 or less (e.g., 5.5 to 10, 2.34 to 3.56, and so forth) or any value from 1 to 10 (e.g., 3, 5.8, 9.9994, and so forth).

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method of separating one or more components from a mold-fermented composition, comprising:
   during the process of producing a final version of a mold-fermented composition, separating from the mold-fermented composition a first separation composition; and
   subsequent to and distinct from separating the first separation composition from the mold-fermented composition, isolating or separating a second separation composition from the first separation composition, the second separation composition comprising a first separation component and a second separation component;
   wherein the first separation component is residual undigested protein and the second separation component is selected from the group consisting of mold and yeast; and
   wherein the first separation component and the second separation component combined are greater than 50 wt % of the second separation composition.

2. The method of claim 1, wherein the mold-fermented composition is a mold-fermented beverage.

3. The method of claim 2, wherein the mold-fermented beverage is sake and the first separation composition is sake kasu, or the mold-fermented beverage is mirin and the first separation composition is mirin kasu.

4. The method of claim 1, wherein the mold-fermented composition is a mold-fermented food.

5. The method of claim 4, wherein the mold-fermented food is soy sauce, and the first separation composition is shoyu kasu.

6. The method of claim 1, wherein the second separation component is a mold.

7. The method of claim 6, wherein the mold comprises filamentous fungus and the residual undigested protein comprises rice protein.

8. The method of claim 6, wherein the second separation composition further comprises a third separation component, the third separation component being yeast.

9. The method of claim 8, wherein the first separation component, the second separation component, and the third separation component combined are greater than 80 wt % of the second separation composition.

10. A method of separating one or more components from a mold-fermented composition, comprising:
    during the process of producing a final version of a mold-fermented composition, separating from the mold-fermented composition a first separation composition; and
    subsequent to and distinct from separating the first separation composition from the mold-fermented composition, isolating or separating a second separation composition from the first separation composition, the second separation composition comprising a first separation component and a second separation component;
    wherein the first separation component is residual undigested protein and the second separation component is selected from the group consisting of mold and yeast; and
    wherein second separation composition has a total protein content greater than 35 wt. % on a dry weight basis.

11. The method of claim 10, wherein second separation composition has a total protein content greater than 50 wt. % on a dry weight basis.

12. The method of claim 10, wherein the mold-fermented composition is a mold-fermented beverage.

13. The method of claim 12, wherein the mold-fermented beverage is sake and the first separation composition is sake kasu, or the mold-fermented beverage is mirin and the first separation composition is mirin kasu.

14. The method of claim 10, wherein the mold-fermented composition is a mold-fermented food.

15. The method of claim 14, wherein the mold-fermented food is soy sauce, and the first separation composition is shoyu kasu.

16. The method of claim 10, wherein the second separation component is a mold.

17. The method of claim 16, wherein the mold comprises filamentous fungus and the residual undigested protein comprises rice protein.

18. A method of separating one or more components from a mold-fermented composition, comprising:
    during the process of producing a final version of a mold-fermented composition, separating from the mold-fermented composition a first separation composition; and
    subsequent to and distinct from separating the first separation composition from the mold-fermented composition, isolating or separating a second separation composition from the first separation composition, the second separation composition comprising a first separation component and a second separation component;
    wherein the first separation component and the second separation component is selected from the group consisting of mold and yeast; and
    wherein a protein content of the second separation composition as measured on a dry weight basis is greater than 150% of a protein content of the first separation composition measured on a dry weight basis immediately prior to separating the second separation composition from the first separation composition.

19. The method of claim 18, wherein the mold-fermented composition is a mold-fermented beverage.

20. The method of claim 19, wherein the mold-fermented beverage is sake and the first separation composition is sake kasu, or the mold-fermented beverage is mirin and the first separation composition is mirin kasu.

21. The method of claim 18, wherein the mold-fermented composition is a mold-fermented food.

22. The method of claim 21, wherein the mold-fermented food is soy sauce, and the first separation composition is shoyu kasu.

23. The method of claim 18, wherein the second separation component is a mold.

24. The method of claim 23, wherein the mold comprises filamentous fungus and the residual undigested protein comprises rice protein.

* * * * *